(12) United States Patent
Witalis et al.

(10) Patent No.: US 12,258,139 B2
(45) Date of Patent: Mar. 25, 2025

(54) GROUND-BASED AIRCRAFT MOVEMENT

(71) Applicant: RTX Corporation, Farmington, CT (US)

(72) Inventors: Stephen A. Witalis, Glastonbury, CT (US); Ramesh Rajagopalan, Glastonbury, CT (US); Manuj Dhingra, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/152,920

(22) Filed: Jan. 11, 2023

(65) Prior Publication Data

US 2023/0219693 A1 Jul. 13, 2023

Related U.S. Application Data

(60) Provisional application No. 63/299,154, filed on Jan. 13, 2022.

(51) Int. Cl.
| | |
|---|---|
| *F02C 6/00* | (2006.01) |
| *B64D 27/10* | (2006.01) |
| *B64D 27/24* | (2006.01) |
| *B64D 31/06* | (2006.01) |
| *F02C 7/26* | (2006.01) |
| *B64D 27/02* | (2006.01) |

(52) U.S. Cl.
CPC .............. *B64D 31/06* (2013.01); *B64D 27/10* (2013.01); *B64D 27/24* (2013.01); *F02C 6/00* (2013.01); *F02C 7/26* (2013.01); *B64D 27/026* (2024.01); *F05D 2260/85* (2013.01)

(58) Field of Classification Search
CPC .. F02C 7/268; F02C 7/275; F02C 6/00; F02C 6/005
See application file for complete search history.

(56) References Cited

U.S. PATENT DOCUMENTS

| | | | |
|---|---|---|---|
| 7,802,757 B2 | 9/2010 | Dooley et al. | |
| 7,980,509 B2* | 7/2011 | Bhargava | B64C 25/405 244/50 |
| 8,684,304 B2 | 4/2014 | Burns et al. | |
| 10,336,461 B2 | 7/2019 | MacKin | |
| 2012/0119020 A1 | 5/2012 | Burns et al. | |
| 2013/0031912 A1* | 2/2013 | Finney | F02C 7/277 60/778 |
| 2017/0190441 A1* | 7/2017 | Mackin | F01D 15/10 |
| 2017/0234238 A1* | 8/2017 | Schwarz | F01D 21/00 60/778 |
| 2019/0375512 A1* | 12/2019 | Ribeiro | B64D 27/24 |
| 2020/0056546 A1* | 2/2020 | Terwilliger | F02C 9/54 |
| 2020/0056551 A1* | 2/2020 | Epstein | F04D 27/004 |
| 2020/0200099 A1* | 6/2020 | Rajagopalan | F01D 19/02 |

* cited by examiner

*Primary Examiner* — Thuyhang N Nguyen
(74) *Attorney, Agent, or Firm* — CANTOR COLBURN LLP (57) ABSTRACT

An engine system for an aircraft includes a gas turbine engine and a control system. The control system is configured to motor the gas turbine engine, absent fuel burn, during a taxi mode of the aircraft. The control system is further configured to accelerate a motoring speed of the gas turbine engine, absent fuel burn, above an idle speed of the gas turbine engine to provide propulsion during the taxi mode. The control system is configured to decrease the motoring speed of the gas turbine engine, absent fuel burn, based on a change in a starting mode of the gas turbine engine or the aircraft reaching a targeted new position.

18 Claims, 5 Drawing Sheets

GROUND-BASED AIRCRAFT MOVEMENT

CROSS-REFERENCE TO RELATED APPLICATIONS

This application claims the benefit of U.S. Provisional Application No. 63/299,154 filed Jan. 13, 2022, the disclosure of which is incorporated herein by reference in its entirety.

BACKGROUND

The subject matter disclosed herein generally relates to aircraft and, more particularly, to a method and an apparatus for ground-based aircraft movement.

Gas turbine engines are used in numerous applications, one of which is for providing thrust to an aircraft. Gas turbine engines are typically operated while the aircraft is also on the ground, such as during taxiing from a gate prior to takeoff and taxiing back to the gate after landing. In some instances, on-ground operation at idle can be performed for extended periods of time, particularly at busy airports. The on-ground operation at idle can result in sustained periods of non-flight fuel burn and contributes to engine wear as well as associated operating noise, tire wear, brake wear, and fuel-burn emissions. The aircraft may need to be re-positioned on the ground after engine shutdown. Where one or more engines are used for repositioning the aircraft, an extended waiting period may be needed to allow the engines to cool down prior to the next engine start.

BRIEF DESCRIPTION

According to one embodiment, an engine system for an aircraft includes a gas turbine engine and a control system. The control system is configured to motor the gas turbine engine, absent fuel burn, during a taxi mode of the aircraft. The control system is further configured to accelerate a motoring speed of the gas turbine engine, absent fuel burn, above an idle speed of the gas turbine engine to provide propulsion during the taxi mode. The control system is configured to decrease the motoring speed of the gas turbine engine, absent fuel burn, based on a change in a starting mode of the gas turbine engine or the aircraft reaching a targeted new position.

In addition to one or more of the features described above or below, or as an alternative, further embodiments may include where the control system is further configured to initiate an engine start sequence of the gas turbine engine based on detecting an auto-start mode selection as the change in the starting mode.

In addition to one or more of the features described above or below, or as an alternative, further embodiments may include where the control system is further configured to control a starter, fuel flow, and ignitors of the gas turbine engine to start fuel combustion during the taxi mode based on detecting the auto-start mode selection.

In addition to one or more of the features described above or below, or as an alternative, further embodiments may include where the motoring speed is driven by one or more of: an electric motor, a pneumatic drive, and a hydraulic drive powered by one or more of: an auxiliary power unit, a battery system, an electric generator, a hydraulic source, and a pneumatic source.

In addition to one or more of the features described above or below, or as an alternative, further embodiments may include where the control system is further configured to power one or more electric actuators to drive the motoring speed and depower the one or more electric actuators after reaching the targeted new position.

In addition to one or more of the features described above or below, or as an alternative, further embodiments may include where the control system is further configured to decrease the motoring speed of the gas turbine engine to the idle speed or a below idle speed after reaching the targeted new position.

In addition to one or more of the features described above or below, or as an alternative, further embodiments may include where the decrease of the motoring speed of the gas turbine engine is performed by a reduction in pressure delivered to a starter of the gas turbine engine.

In addition to one or more of the features described above or below, or as an alternative, further embodiments may include where the motoring speed is reached based on controlling a starter to dry motor the gas turbine engine. The starter can be coupled to a high speed spool of the gas turbine engine, and the starter can be controlled based on a speed of a low speed spool of the gas turbine engine and/or a taxi speed of the aircraft.

In addition to one or more of the features described above or below, or as an alternative, further embodiments may include where the motoring speed is reached based on controlling an electric motor of the gas turbine engine.

In addition to one or more of the features described above or below, or as an alternative, further embodiments may include where the motoring speed is reached based on controlling a starter and an electric motor of the gas turbine engine.

In addition to one or more of the features described above or below, or as an alternative, further embodiments may include where the gas turbine engine is a first gas turbine engine and further including a second gas turbine engine, where a starter provides a first motoring speed of the first gas turbine engine and an electric motor provides a second motoring speed of the second gas turbine engine during the taxi mode.

According to another embodiment, a method of engine system control of an aircraft is provided. The method includes motoring a gas turbine engine, absent fuel burn, during a taxi mode of the aircraft, accelerating a motoring speed of the gas turbine engine, absent fuel burn, above an idle speed of the gas turbine engine to provide propulsion during the taxi mode, and decreasing the motoring speed of the gas turbine engine, absent fuel burn, based on a change in a starting mode of the gas turbine engine or the aircraft reaching a targeted new position.

In addition to one or more of the features described above or below, or as an alternative, further embodiments may include initiating an engine start sequence of the gas turbine engine based on detecting an auto-start mode selection as the change in the starting mode.

In addition to one or more of the features described above or below, or as an alternative, further embodiments may include controlling a starter, fuel flow, and ignitors of the gas turbine engine to start fuel combustion during the taxi mode based on detecting the auto-start mode selection.

In addition to one or more of the features described above or below, or as an alternative, further embodiments may include powering one or more electric actuators to drive the motoring speed, and depowering the one or more electric actuators after reaching the targeted new position.

In addition to one or more of the features described above or below, or as an alternative, further embodiments may include where the gas turbine engine is a first gas turbine engine and a starter provides a first motoring speed of the first gas turbine engine, and an electric motor provides a second motoring speed of a second gas turbine engine of the aircraft during the taxi mode.

A technical effect of the apparatus, systems and methods is achieved by controlling an engine system of an aircraft for ground-based aircraft movement.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
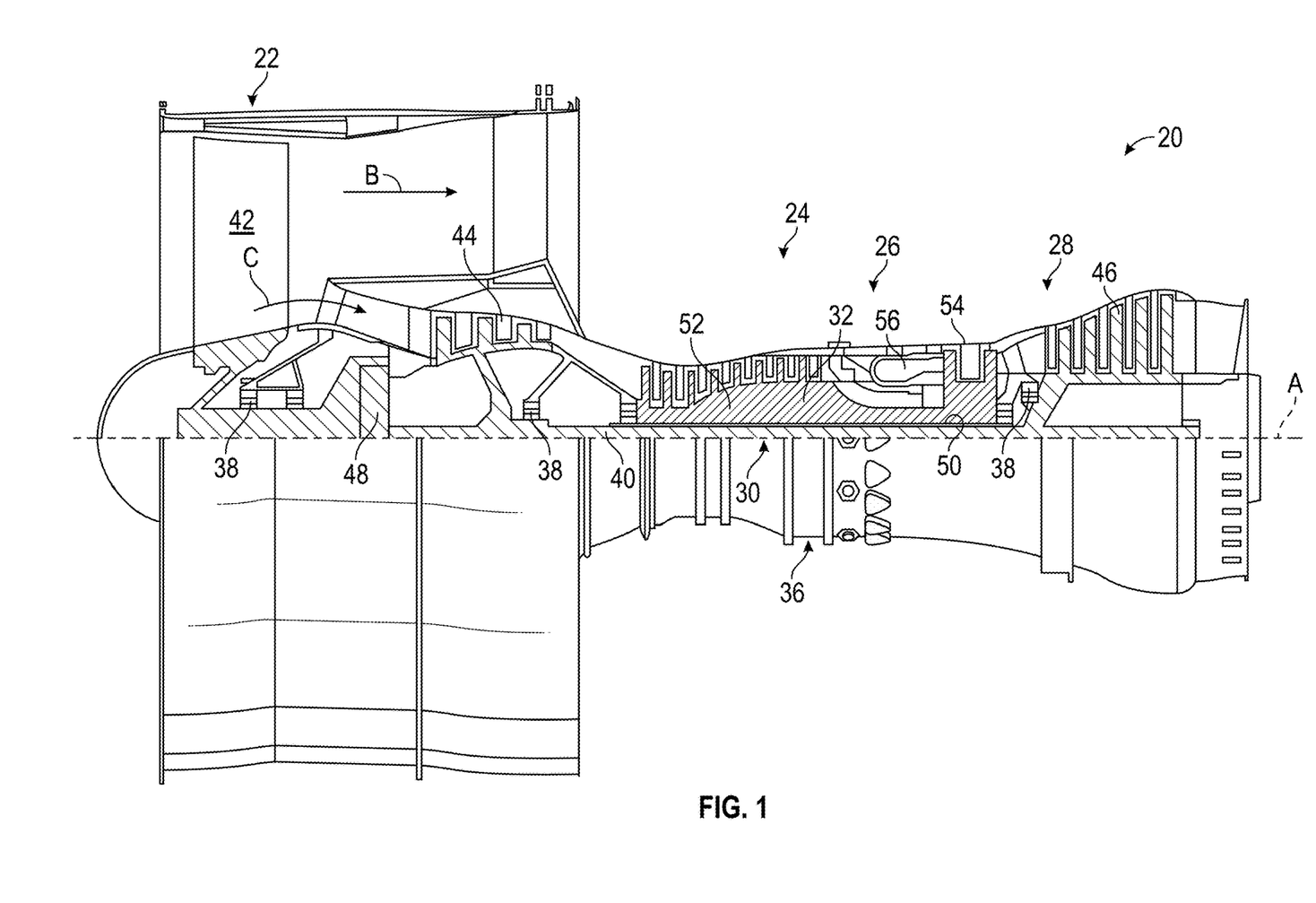
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including single-spool and three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine engine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 m/sec).

While the example of FIG. 1 illustrates one example of the gas turbine engine 20, it will be understood that any number of spools, inclusion or omission of the gear system 48, and/or other elements and subsystems are contemplated. Further, rotor systems described herein can be used in a variety of applications and need not be limited to gas turbine engines for aircraft applications.

Figure 2:
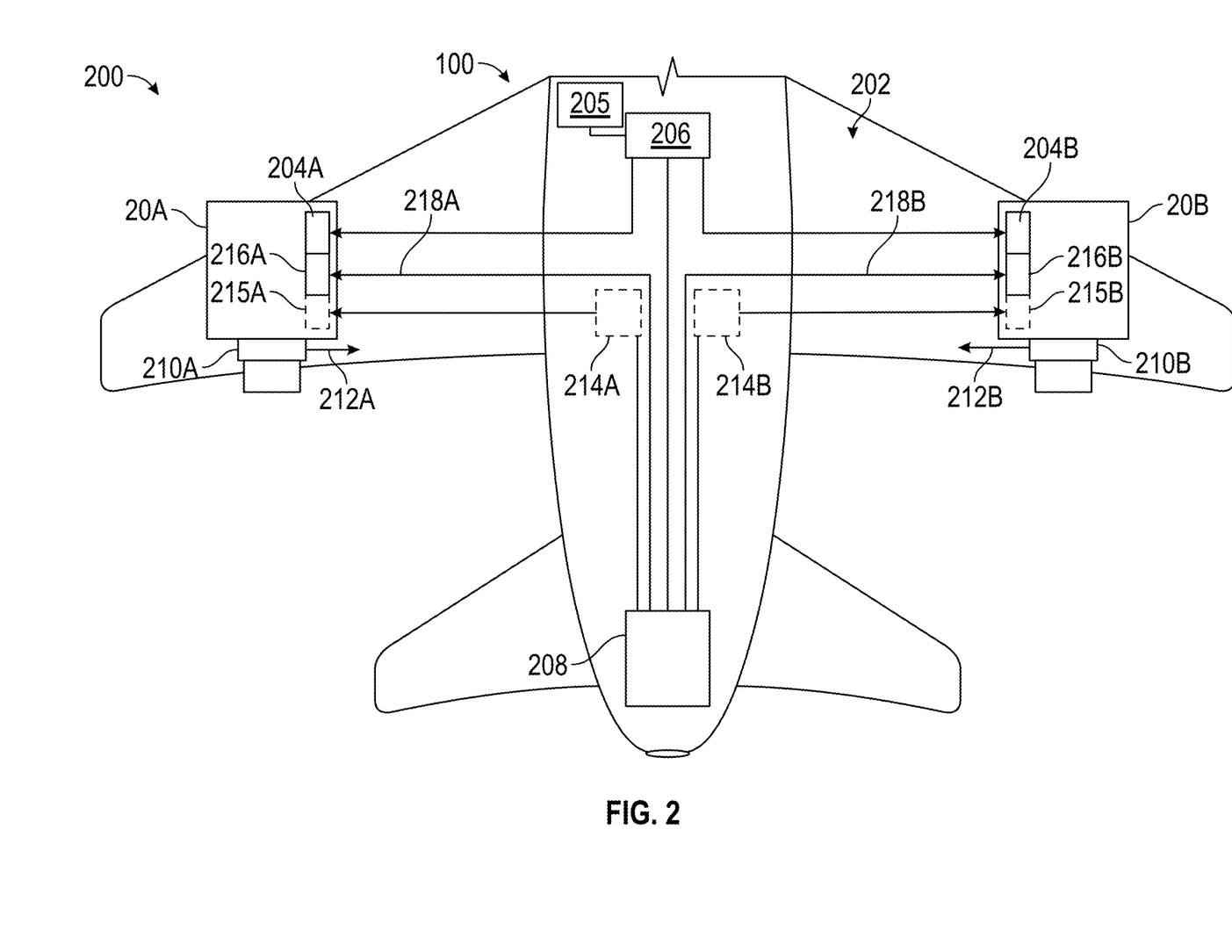
FIG. 2 is a schematic diagram of an engine system of an aircraft, in accordance with an embodiment of the disclosure.

Referring now to FIG. 2, a schematic illustration of an aircraft 100 includes an engine system 200 with first and second gas turbine engines 20A, 20B as embodiments of the gas turbine engine 20 of FIG. 1. Although the engine system 200 is depicted with two gas turbine engines 20, it will be understood that the engine system 200 can include additional gas turbine engines (e.g., three or more instances of the gas turbine engine 20 on the aircraft 100). Continuing with a two-engine example for purposes of explanation, each of the first and second gas turbine engines 20A, 20B can have an associated engine controller 204A, 204B. The engine controllers 204A, 204B can receive commands and data from an aircraft controller 206 of the aircraft 100. The aircraft controller 206 can accept input from and provide output to a pilot interface 205. The pilot interface 205 can include redundant instances of switches, knobs, levers, buttons, displays, and the like, which can be controlled by a pilot and/or co-pilot of the aircraft 100. Collectively, the engine controllers 204A, 204B and aircraft controller 206 may be referred to as a control system 202. Control logic and command generation can be implemented by any portion of the control system 202 and may be distributed, for example, between the engine controllers 204A, 204B and/or aircraft controller 206. The aircraft controller 206 may receive pilot inputs though pilot interface 205 and control multiple aspects of the aircraft 100. Examples of pilot inputs can be normal operating commands and/or override commands. For instance, a pilot can override a motoring sequence, as described herein, based on various conditions, such as, a flight delay, a return-to-gate condition, a maintenance condition, an engine shutdown condition, and other such factors. The aircraft controller 206 and/or engine controllers 204A, 204B can also support automated modes of operation, such as an auto-start mode, an auto-cooldown mode, an auto-pilot mode, and other such modes. The engine controllers 204A, 204B can be embodied in one or more full authority digital engine controls (FADECs), for example.

The engine controllers 204A, 204B and aircraft controller 206 can each include memory to store instructions that are executed by one or more processors on one or more channels. The executable instructions may be stored or organized in any manner and at any level of abstraction, such as in connection with a controlling and/or monitoring operation of the first and second gas turbine engines 20A, 20B. The one or more processors can be any type of central processing unit (CPU), including a general purpose processor, a digital signal processor (DSP), a microcontroller, an application specific integrated circuit (ASIC), a field programmable gate array (FPGA), or the like. Also, in embodiments, the memory may include random access memory (RAM), read only memory (ROM), or other electronic, optical, magnetic, or any other computer readable medium onto which is stored data and control algorithms in a non-transitory form.

In the example of FIG. 2, the engine controllers 204A, 204B can meter a fuel flow to the combustor section 26 (FIG. 1) of respective gas turbine engines 20A, 20B based on a current operating mode of the aircraft 100 according to one or more fuel burn schedules. For example, the engine controllers 204A, 204B can meter a fuel flow to the combustor section 26 according to an idle fuel burn schedule, a take-off fuel burn schedule, a climb fuel burn schedule, a cruise fuel burn schedule, a descent fuel burn schedule, and a landing fuel burn schedule. The characteristics of the fuel burn schedules may be adjusted for aircraft and environmental conditions. To reduce fuel consumption while operating on the ground, embodiments perform taxiing of the aircraft 100 absent fuel burn by the gas turbine engines 20A, 20B. Each of the gas turbine engines 20A, 20B can have a starter 216A, 216B that is configured to drive rotation of the high speed spool 32 within each of the gas turbine engines 20A, 20B respectively. Driving rotation of the high speed spool 32 can increase pressure in the combustor 56 to support ignition by ignitors and subsequent fuel burn.

In embodiments, the starters 216A, 216B can be driven in a dry cranking mode, where fuel burn is inhibited, to establish an airflow through the gas turbine engines 20A, 20B. Although the high speed spool 32 is not directly coupled to the fan 42, by motoring the high speed spool 32 at a motoring speed above an idle speed of the gas turbine engines 20A, 20B, the airflow drawn into the gas turbine engines 20A, 20B can also result in driving rotation of the low speed spool 30 and the fan 42 to provide propulsion during the taxi mode. Idle speed can refer to a lowest speed at which the gas turbine engines 20A, 20B typically operate with fuel burn when on the ground with a minimum fuel burn thrust. In some embodiments, a motor 215A, 215B can be coupled to the low speed spool 30 to provide a supplemental or alternate source of rotational power to the low speed spool 30. For instance, the sizing of the motors 215A, 215B can be reduced when configured for use in combination with the starters 216A, 216B as compared to relying only upon the motors 215A, 215B for taxi mode operations. Depending upon the component sizing and available power, the starters 216A, 216B and/or motors 215A, 215B can be operated sequentially or in parallel. For instance, where different power sources are used, the aircraft 100 may taxi with gas turbine engine 20A being driven by starter 216A, for instance through pneumatic power, and with gas turbine engine 20B being driven by motor 215B, for instance through electric power. The use of power sources between engine pairs can alternate to balance component life.

Various power source options for the starters 216A, 216B and/or motors 215A, 215B can include a power source 208 and/or a stored power source 214A, 214B. In the example of FIG. 2, the power source 208 is depicted as providing input power 218A, 218B to the starters 216A, 216B respectively. For instance, the power source 208 can be an auxiliary power unit, an electric generator, a hydraulic source, a pneumatic source, and/or another source of power known in the art. The stored power sources 214A, 214B can be a battery system, supercapacitors, ultracapacitors, a flywheel system, or other such forms of stored power. The stored power sources 214A, 214B can be recharged, for example, by power supplied from the power source 208. In some embodiments, the motors 215A, 215B can be motor/generators, where the motors 215A, 215B may be operated in a generator mode to store power in the stored power sources 214A, 214B. Further, the starters 216A, 216B can be motor/generators, which may receive power from or deliver power to the stored power sources 214A, 214B. The motors 215A, 215B and starters 216A, 216B can be implemented using a variety of sources of power. For instance, the motors 215A, 215B and/or starters 216A, 216B can include one or more of an electric motor, a pneumatic drive, and a hydraulic drive powered by one or more of: an auxiliary power unit (APU), a battery system, an electric generator, a hydraulic source, and a pneumatic source. Further, although depicted in close proximity to the gas turbine engines 20A, 20B, the motors 215A, 215B and/or starters 216A, 216B can be distributed at other locations of the aircraft 100. For instance, where the power source 208 is an APU, a motor/generator can be driven by the APU to provide taxi-mode and/or starting power for the gas turbine engines 20A, 20B.

Where the speed of the high speed spool 32 is increased above an idle speed to draw in airflow during taxiing prior to fuel combustion, one or more engine bleeds 210A, 210B of the gas turbine engines 20A, 20B can be controlled to extract an engine bleed flow 212A, 212B to reduce pressure within the gas turbine engines 20A, 20B prior to starting. Other approaches to reducing pressure within the gas turbine engines 20A, 20B before starting can include reducing/stopping input power 218A, 218B by controlling one or more valves, venting pneumatic power, and/or controlling the power source 208 to reduce/prevent delivery of the input power 218A, 218B.

During normal operation, heating within the first and second gas turbine engines 20A, 20B can result in thermal distortion of one or more spools (e.g., low speed spool 30 and/or high speed spool 32 of FIG. 1) during engine shutdown such that on restart, vibration and/or rubbing of blade tips within an engine casing can result, particularly where the rotational speed increases towards a major resonance speed (which may be referred to as a critical speed). Performing taxiing operations by driving rotation within the gas turbine engines 20A, 20B without fuel burn active can result in reducing internal temperatures of the gas turbine engines 20A, 20B to reduce/prevent bowed rotor conditions and avoid rubbing as the rotational speed increases up to and beyond the critical speed.

The starters 216A, 216B and/or motors 215A, 215B can interface to respective engines 20A, 20B through gear trains, gearboxes, shafts, clutches, and/or other interfaces that provide the starters 216A, 216B and/or motors 215A, 215B with a linkage to control rotation of an engine core of the first and second gas turbine engines 20A, 20B. For instance, the starters 216A, 216B and/or motors 215A, 215B can each be an electric motor that results in rotation of the first and second gas turbine engines 20A, 20B at targeted speeds to support taxiing of the aircraft 100, as one example. Alternatively, the starters 216A, 216B can be pneumatic starters, such as an air turbine starter, that rotates components of the first and second gas turbine engines 20A, 20B at targeted speeds. As a further alternative, the starters 216A, 216B and/or motors 215A, 215B can be driven to rotate by pressurized hydraulic fluid.

A speed of the low speed spool 30 (also referred to as N1 speed) can be monitored by engine controllers 204A, 204B and/or through the aircraft controller 206 and/or through the pilot interface 205, where the speed of the low speed spool 30 serves as a proxy for taxi speed. Further or alternatively, other sensed or derived values can be used to determine a taxi speed of the aircraft 100, such as wheel speed. The speed of the high speed spool 32 can be increased or decreased based on the speed of the low speed spool 30 and/or based on a taxi speed of the aircraft 100. The starters 216A, 216B can be controlled in response to the speed of the low speed spool 30 and/or based on an observed taxi speed of the aircraft 100. Driving rotation of the high speed spool 32 may not map precisely to a taxi speed, since the fan 42 of FIG. 1 provides the majority of ground-based propulsion for taxi operations, and the high speed spool 32 is not directly coupled to the fan 42. When the low speed spool 30 is not directly driven by the motors 215A, 215B, the rotation of the high speed spool 32 driven by the starters 216A, 216B can result in rotation of the low speed spool 30 as air is drawn into the engine core in response to rotation of the high speed spool 32, thereby resulting in rotation of the fan 42. Where the starters 216A, 216B are pneumatic or hydraulic, the rotational speed may be controlled by one or more valves. For instance, a speed reduction may be achieved by opening one or more bleed valves, partially closing one or more flow control valves, applying pulse-width modulation to open and close valves with a targeted duty cycle, and/or reducing a source of input fluid, such as air from an auxiliary power unit. Speed increases provided by the starters 216A, 216B can be performed by closing one or more bleed valves, opening one or more flow control valves, modifying a duty cycle where pulse-width modulation is used for valve control, and/or increasing a source of input fluid, such as air from an auxiliary power unit. Where the starters 216A, 216B are electrically driven, the speed can be controlled by increasing or decreasing electrical current provided to the starters 216A, 216B. Using the speed of the low speed spool 30 and/or the taxi speed of the aircraft 100 as a control input for the starters 216A, 216B that drive rotation of the high speed spool 32 can provide a wider range of flexibility in controlling the power delivery to the starters 216A, 216B as the rotational speed of the high speed spool 32 (also referred to as N2 speed) need not be precisely controlled to a specific target value.

Figure 3:
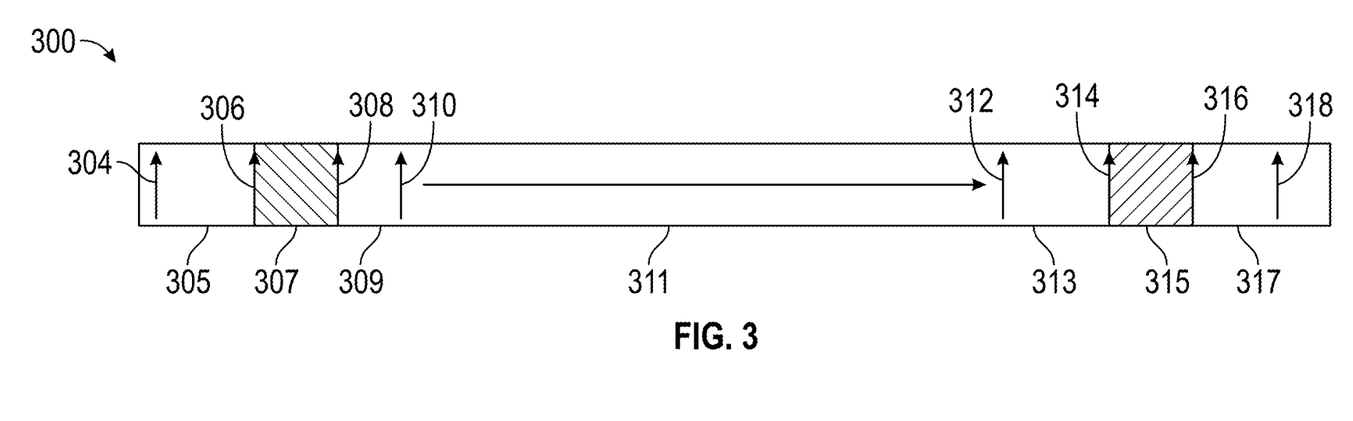
FIG. 3 is a sequence diagram for operation of an engine system of an aircraft, in accordance with an embodiment of the disclosure.

FIG. 3 depicts a sequence diagram 300 for operation of the engine system 200 of aircraft 100 with further reference to FIGS. 1-2. Time progresses from left to right on FIG. 3 and is not to scale; rather, the sequence diagram 300 is a sequential illustration for purposes of explanation.

In the example of FIG. 3, a pushback event 304 of the aircraft 100 can be performed, for instance, while the engines 20A, 20B are depowered. During time 305, the aircraft 100 may be moved by an external force, such as a ground-based tug or cart. Alternatively, the pushback event 304 can include moving a gate or stairs while the aircraft 100 remains stationary. At power-on event 306, one or more actuation systems can be powered on. For instance, the power source 208 (e.g., an APU) can power one or more electric actuators to provide electric power to the starters 216A, 216B and/or motors 215A, 215B. Alternatively, the power-on event 306 can provide pneumatic or hydraulic power for the starters 216A, 216B and/or motors 215A, 215B. During time 307, power can be conditioned until power delivery is ready at event 308, for instance, by accelerating electric generators, setting contactor positions, and the like. At event 308, power can be delivered to the starters 216A, 216B and/or motors 215A, 215B. During time 309, power delivery to the starters 216A, 216B and/or motors 215A, 215B can be at an amount to establish rotation of the engine core within either or both of the gas turbine engines 20A, 20B but may not be at a high enough level to taxi the aircraft 100. At event 310, a taxi mode is initiated to reposition the aircraft 100 on the ground. During time 311, either or both of the gas turbine engines 20A, 20B are motored, absent fuel burn, using the starters 216A, 216B and/or motors 215A, 215B. A motoring speed of either or both of the gas turbine engines 20A, 20B can be accelerated, absent fuel burn, above an idle speed to provide propulsion during the taxi mode. At event 312, a targeted new position of the aircraft 100 is reached. During time 313, the motoring speed of either or both of the gas turbine engines 20A, 20B can be decreased, absent fuel burn. For instance, the starters 216A, 216B and/or motors 215A, 215B may continue to rotate components of the gas turbine engines 20A, 20B to drive accessories and keep the aircraft 100 is a ready state. At event 314, a shutdown process may be initiated where the actuators or power provided to the starters 216A, 216B and/or motors 215A, 215B is reduced to an off state. During time 315, depowering of the power source 208 can occur. At event 316, the depowering of the power source 208 can be completed. At time 317, rotation within the gas turbine engines 20A, 20B is reduced until rotation ceases at event 318 and engine shutdown completes.

Figure 4:
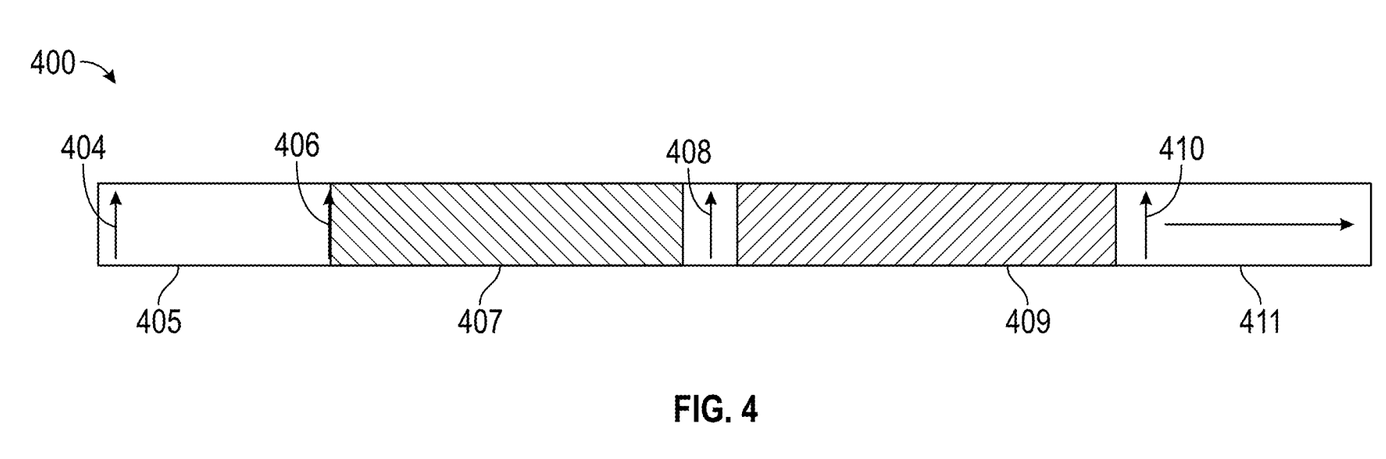
FIG. 4 is a sequence diagram for operation of an engine system of an aircraft, in accordance with an embodiment of the disclosure.

FIG. 4 depicts a sequence diagram 400 for operation of the engine system 200 of aircraft 100 with further reference to FIGS. 1-2. Time progresses from left to right on FIG. 4 and is not to scale; rather, the sequence diagram 400 is a sequential illustration for purposes of explanation. The example of FIG. 4 is described with respect to using the starters 216A, 216B, for instance, in embodiments where the motors 215A, 215B are not installed or used.

In the example of FIG. 4, a pushback event 404 of the aircraft 100 can be performed, for instance, while the engines 20A, 20B are depowered. During time 405, the aircraft 100 may be moved by an external force, such as a ground-based tug or cart. Alternatively, the pushback event 404 can include moving a gate or stairs while the aircraft 100 remains stationary. At an initiate taxi event 406, one or more actuation systems can be powered on. For instance, the power source 208 (e.g., an APU) can power one or more electric actuators to provide electric or pneumatic power to the starters 216A, 216B. During time 407, the starters 216A, 216B can operate absent fuel burn to motor either or both of the gas turbine engines 20A, 20B during taxi mode. At event 408, the pilot or co-pilot may decide to activate an auto-start mode of either or both of the gas turbine engines 20A, 20B during taxiing, for instance through pilot interface 205. The engine controllers 204A, 204B can initiate an engine start sequence of either or both of the gas turbine engines 20A, 20B based on detecting an auto-start mode selection as a change in starting mode (e.g., from a previous selection of manual starting control). The engine controllers 204A, 204B can control the starters 216A, 216B, fuel flow, and ignitors of either or both of the gas turbine engines 20A, 20B to start fuel combustion during the taxi mode based on detecting the auto-start mode selection. The engine controllers 204A, 204B can also control the engine bleeds 210A, 210B and/or other aspects of the gas turbine engines 20A, 20B selected for automated start sequencing. Upon reaching necessary conditions for starting, either or both of the gas turbine engines 20A, 20B can switch to a fuel-burning mode of operation during taxi mode in time 409. At event 410, the aircraft 100 can reach a targeted new position and may proceed during time 411 to resume taxiing, transition to take-off, or perform a shutdown.

Figure 5:
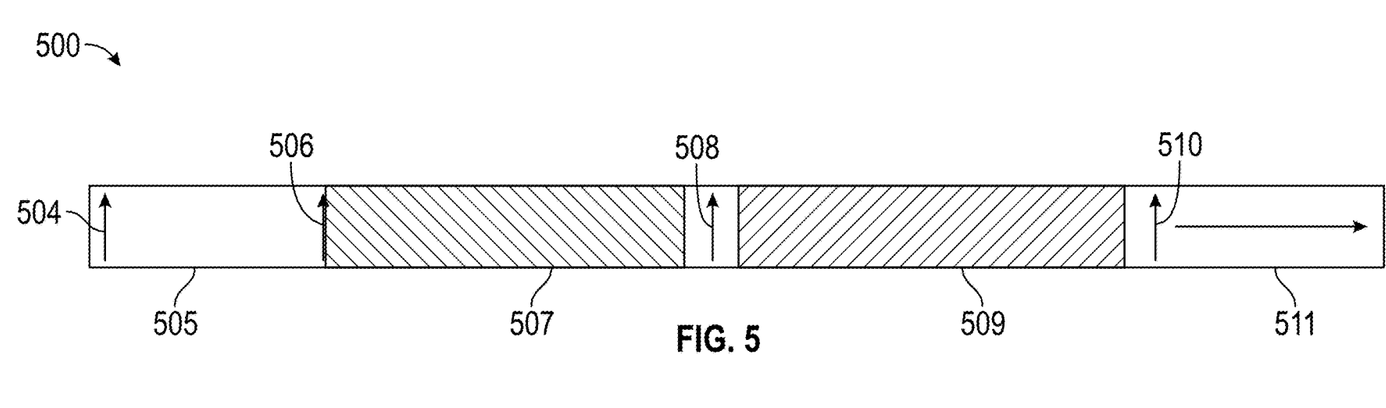
FIG. 5 is a sequence diagram for operation of an engine system of an aircraft, in accordance with an embodiment of the disclosure.

FIG. 5 depicts a sequence diagram 500 for operation of the engine system 200 of aircraft 100 with further reference to FIGS. 1-2. Time progresses from left to right on FIG. 5 and is not to scale; rather, the sequence diagram 500 is a sequential illustration for purposes of explanation. The example of FIG. 5 is described with respect to using both the motors 215A, 215B and the starters 216A, 216B, for instance, in embodiments where the motors 215A, 215B are sized to provide power to drive rotation of fan 42 during taxi mode.

In the example of FIG. 5, a pushback event 504 of the aircraft 100 can be performed, for instance, while the engines 20A, 20B are depowered. During time 505, the aircraft 100 may be moved by an external force, such as a ground-based tug or cart. Alternatively, the pushback event 504 can include moving a gate or stairs while the aircraft 100 remains stationary. At an initiate taxi event 506, one or more motors 215A, 215B can be powered by the power source 208 and/or stored power source 214A, 214B. During time 507, the motors 215A, 215B can operate absent fuel burn to motor either or both of the gas turbine engines 20A, 20B during taxi mode. At event 508, the pilot or co-pilot may decide to activate an auto-start mode of either or both of the gas turbine engines 20A, 20B during taxiing, for instance through pilot interface 205. The engine controllers 204A, 204B can initiate an engine start sequence of either or both of the gas turbine engines 20A, 20B based on detecting an auto-start mode selection as a change in starting mode (e.g., from a previous selection of manual starting control). The engine controllers 204A, 204B can control the starters 216A, 216B, fuel flow, and ignitors of either or both of the gas turbine engines 20A, 20B to start fuel combustion during the taxi mode based on detecting the auto-start mode selection. The engine controllers 204A, 204B can also control the engine bleeds 210A, 210B and/or other aspects of the gas turbine engines 20A, 20B selected for automated start sequencing. In some embodiments, the motors 215A, 215B can remain active to continue motoring of the fan 42 during the starting process in time 509. As fuel burn commences, the output of the motors 215A, 215B can be tapered off. At event 510, the aircraft 100 can reach a targeted new position and may proceed during time 511 to resume taxiing, transition to take-off, or perform a shutdown.

Figure 6:
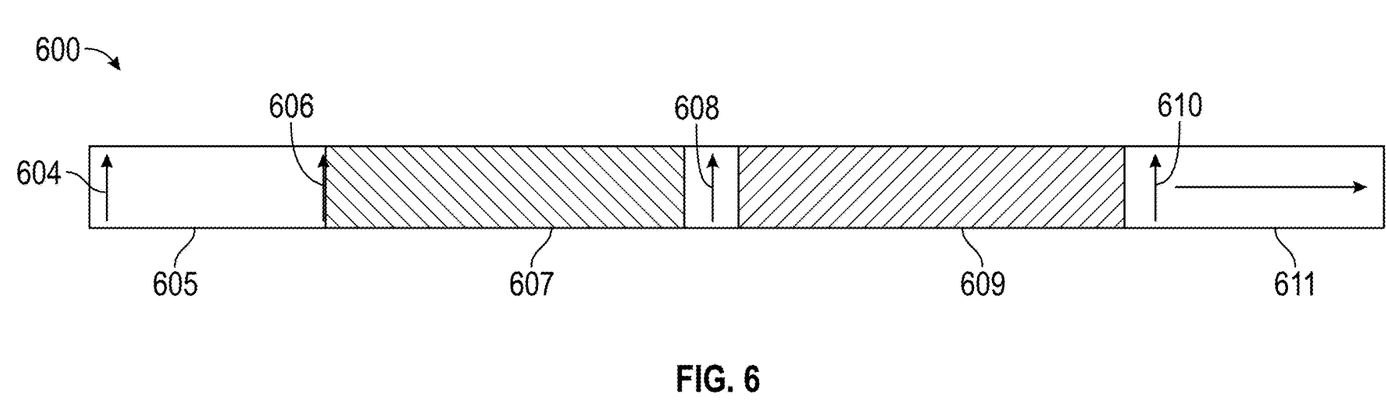
FIG. 6 is a sequence diagram for operation of an engine system of an aircraft, in accordance with an embodiment of the disclosure.

FIG. 6 depicts a sequence diagram 600 for operation of the engine system 200 of aircraft 100 with further reference to FIGS. 1-2. Time progresses from left to right on FIG. 6 and is not to scale; rather, the sequence diagram 600 is a sequential illustration for purposes of explanation. The example of FIG. 6 is described with respect to using the motors 215A, 215B, for instance, in embodiments where the starters 216A, 216B are not installed or used.

In the example of FIG. 6, a pushback event 604 of the aircraft 100 can be performed, for instance, while the engines 20A, 20B are depowered. During time 605, the aircraft 100 may be moved by an external force, such as a ground-based tug or cart. Alternatively, the pushback event 604 can include moving a gate or stairs while the aircraft 100 remains stationary. At an initiate taxi event 606, one or more motors 215A, 215B can be powered by the power source 208 and/or stored power source 214A, 214B. During time 607, the motors 215A, 215B can operate absent fuel burn to motor either or both of the gas turbine engines 20A, 20B during taxi mode. At event 608, the pilot or co-pilot may decide to activate an auto-start mode of either or both of the gas turbine engines 20A, 20B during taxiing, for instance through pilot interface 205. The engine controllers 204A, 204B can initiate an engine start sequence of either or both of the gas turbine engines 20A, 20B based on detecting an auto-start mode selection as a change in starting mode (e.g., from a previous selection of manual starting control). The engine controllers 204A, 204B can control the fuel flow, and ignitors of either or both of the gas turbine engines 20A, 20B to start fuel combustion during the taxi mode based on detecting the auto-start mode selection. The engine controllers 204A, 204B can also control the engine bleeds 210A, 210B and/or other aspects of the gas turbine engines 20A, 20B selected for automated start sequencing. Upon reaching necessary conditions for starting, either or both of the gas turbine engines 20A, 20B can switch to a fuel-burning mode of operation during taxi mode in time 609. As fuel burn commences, the output of the motors 215A, 215B can be tapered off. At event 610, the aircraft 100 can reach a targeted new position and may proceed during time 611 to resume taxiing, transition to take-off, or perform a shutdown.

Figure 7:
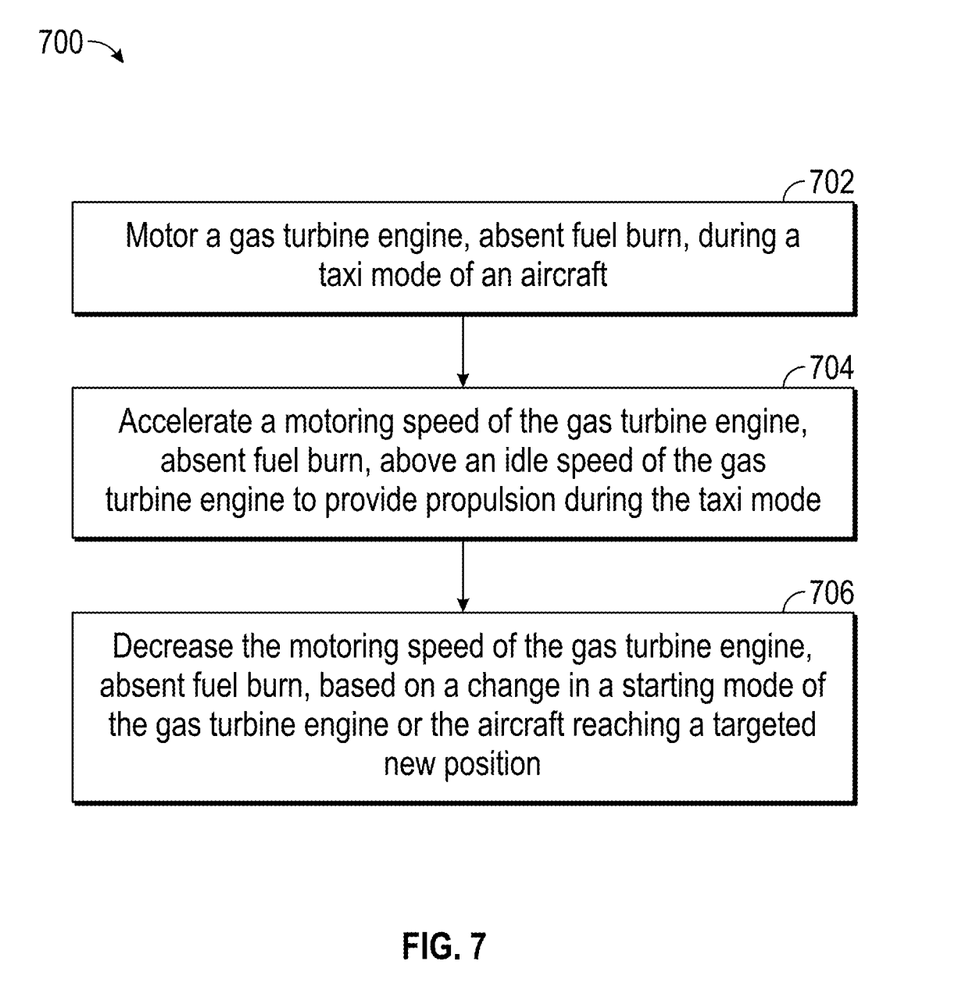
FIG. 7 is a flow chart illustrating a method, in accordance with an embodiment of the disclosure.

Referring now to FIG. 7 with continued reference to FIGS. 1-6, FIG. 7 is a flow chart illustrating a method 700 of engine system control in accordance with an embodiment. The method 700 may be performed, for example, by the engine system 200 of FIG. 2. For purposes of explanation, the method 700 is described primarily with respect to the engine system 200 of FIG. 2; however, it will be understood that the method 700 can be performed on other configurations (not depicted).

At block 702, the control system 202 can motor the gas turbine engine 20A, 20B, absent fuel burn, during a taxi mode of the aircraft 100. Motoring of the gas turbine engine 20A, 20B can include the use of one or more of the starters 216A, 216B and/or motors 215A, 215B to drive the fan 42 of engines 20A, 20B to rotate directly or indirectly. At block 704, the control system 202 can accelerate a motoring speed of the gas turbine engine 20A, 20B, absent fuel burn, above an idle speed of the gas turbine engine 20A, 20B to provide propulsion during the taxi mode. The motoring speed can be driven by one or more of: an electric motor, a pneumatic drive, and a hydraulic drive powered by one or more of: an auxiliary power unit, a battery system, an electric generator, a hydraulic source, and a pneumatic source. For instance, the motor 215A, 215B used for motoring can be a motor/generator that receives power from and charges stored power source 214A, 214B. Further, the starter 216A, 216B can be electrically driven, pneumatically driven, or hydraulicly driven by the power source 208 for motoring. The motoring speed can be reached based on controlling the starter 216A, 216B to dry motor the gas turbine engine 20A, 20B and/or controlling an electric motor (e.g., motor 215A, 215B) of the gas turbine engine 20A, 20B. In some aspects, the starters 216A, 216B drive rotation of the high speed spool 32 of engines 20A, 20B based on a speed of the low speed spool 30 of engines 20A, 20B and/or based on an observed taxi speed of the aircraft 100. Taxi operations can be performed using only the starters 216A, 216B driving rotation of the high speed spool 32 of engines 20A, 20B to induce rotation of the fan 42 absent a physical coupling between the high speed spool 32 and the fan 42 of engines 20A, 20B.

At block 706, the control system 202 can decrease the motoring speed of the gas turbine engine 20A, 20B, absent fuel burn, based on a change in a starting mode of the gas turbine engine 20A, 20B or the aircraft 100 reaching a targeted new position. The control system 202 can be configured to power one or more electric actuators to drive the motoring speed and depower the one or more electric actuators after reaching a targeted new position. The control system 202 can be further configured to decrease the motoring speed of the gas turbine engine 20A, 20B to the idle speed or a below idle speed after reaching the targeted new position. The reaching of a targeted new position can be determined based on input received through the pilot interface 205 and/or instrumentation of the aircraft 100. The decrease of the motoring speed of the gas turbine engine 20A, 20B can be performed by a reduction in pressure delivered to a starter 216A, 216B of the gas turbine engine 20A, 20B.

In embodiments, the control system 202 can initiate an engine start sequence of the gas turbine engine 20A, 20B based on detecting an auto-start mode selection as the change in the starting mode. The control system 202 can control a starter 216A, 216B, a motor 215A, 215B, fuel flow, and ignitors of the gas turbine engine 20A, 20B to start fuel combustion during the taxi mode based on detecting the auto-start mode selection.

In some embodiments, the gas turbine engine 20A and gas turbine engine 20B can be separately controlled. For example, starter 216A can be used to provide a first motoring speed of the gas turbine engine 20A, and motor 215B can be used to provide a second motoring speed of the gas turbine engine 20B during the taxi mode. The sequence and selection of motoring sources can be alternated between taxiing events. Additionally, the control system 202 can operate the engine system 200 when some components, such as the engine controllers 204A, 204B are depowered. For instance, pilot commands issued through the pilot interface 205 can trigger the aircraft controller 206 to control aspects of the motor 215A, 215B, starter 216A, 216B, and/or power source 208 when either or both of the engine controllers 204A, 204B are depowered. Embodiments can include control paths operable through the engine controllers 204A, 204B and/or through other inputs, such as pilot overrides that allow one or more aspects of the motor 215A, 215B, starter 216A, 216B, and/or power source 208 to be controlled separate from the engine controllers 204A, 204B. Control actions can be performed sequentially or in parallel per engine or engine group.

Also, while the above description describes a process for a twin-engine aircraft, a similar procedure can be applied to aircraft with more than two engines. For example, in the case of more than two engines, more than one engine (e.g., one or more additional gas turbine engine 20) may be motored during taxiing.

While the above description has described the flow process of FIG. 7 in a particular order, it should be appreciated that unless otherwise specifically required in the attached claims that the ordering of the steps may be varied. Further, the designation of the first and second gas turbine engines 20A, 20B can be arbitrary and need not map to a particular engine (e.g., left or right) as the designations can change such that at least one of the gas turbine engines 20A, 20B is motored during portions of taxi operations.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An engine system for an aircraft, the engine system comprising:
a gas turbine engine;
a control system configured to:
motor the gas turbine engine, absent fuel burn, during a taxi mode of the aircraft;
accelerate a motoring speed of the gas turbine engine, absent fuel burn, above an idle speed of the gas turbine engine to provide propulsion during the taxi mode; and
decrease the motoring speed of the gas turbine engine, absent fuel burn, based on a change in a starting mode of the gas turbine engine or the aircraft reaching a targeted new position, wherein the motoring speed is driven by a motoring source comprising one or more of: an electric motor, a pneumatic drive, and a hydraulic drive powered by one or more of: an auxiliary power unit, a battery system, an electric generator, a hydraulic source, and a pneumatic source, and selection of the motoring source used to accelerate the gas turbine engine above the idle speed, absent fuel burn, changes between two or more taxiing events, wherein the idle speed comprises a lowest speed at which the gas turbine engine is operable with fuel burn when the aircraft is on ground.

2. The engine system of claim 1, wherein the control system is further configured to:
initiate an engine start sequence of the gas turbine engine based on detecting an auto-start mode selection as the change in the starting mode.

3. The engine system of claim 2, wherein the control system is further configured to:
control a starter, fuel flow, and ignitors of the gas turbine engine to start fuel combustion during the taxi mode based on detecting the auto-start mode selection.

4. The engine system of claim 1, wherein the control system is further configured to power one or more electric actuators to drive the motoring speed and depower the one or more electric actuators after reaching the targeted new position.

5. The engine system of claim 1, wherein the control system is further configured to decrease the motoring speed of the gas turbine engine to the idle speed or a below idle speed after reaching the targeted new position.

6. The engine system of claim 1, wherein the decrease of the motoring speed of the gas turbine engine is performed by a reduction in pressure delivered to a starter of the gas turbine engine.

7. The engine system of claim 1, wherein the motoring speed is reached based on controlling a starter to dry motor the gas turbine engine, wherein the starter is coupled to a high speed spool of the gas turbine engine, and the starter is controlled based on a speed of a low speed spool of the gas turbine engine and/or a taxi speed of the aircraft.

8. The engine system of claim 1, wherein the motoring speed is reached based on controlling the electric motor.

9. The engine system of claim 1, wherein the motoring speed is reached based on controlling a starter and the electric motor.

10. The engine system of claim 1, wherein the gas turbine engine is a first gas turbine engine and further comprising a second gas turbine engine, wherein a starter provides a first motoring speed of the first gas turbine engine and a second electric motor provides a second motoring speed of the second gas turbine engine during the taxi mode.

11. A method of engine system control of an aircraft, the method comprising:
motoring a gas turbine engine, absent fuel burn, during a taxi mode of the aircraft;
accelerating a motoring speed of the gas turbine engine, absent fuel burn, above an idle speed of the gas turbine engine to provide propulsion during the taxi mode; and
decreasing the motoring speed of the gas turbine engine, absent fuel burn, based on a change in a starting mode of the gas turbine engine or the aircraft reaching a targeted new position, wherein the motoring speed is driven by a motoring source comprising one or more of: an electric motor, a pneumatic drive, and a hydraulic drive powered by one or more of: an auxiliary power unit, a battery system, an electric generator, a hydraulic source, and a pneumatic source, and selection of the motoring source used to accelerate the gas turbine engine above the idle speed, absent fuel burn, changes between two or more taxiing events, wherein the idle speed comprises a lowest speed at which the gas turbine engine is operable with fuel burn when the aircraft is on ground.

12. The method of claim 11, further comprising:
initiating an engine start sequence of the gas turbine engine based on detecting an auto-start mode selection as the change in the starting mode.

13. The method of claim 12, further comprising:
controlling a starter, fuel flow, and ignitors of the gas turbine engine to start fuel combustion during the taxi mode based on detecting the auto-start mode selection.

14. The method of claim 11, further comprising:
powering one or more electric actuators to drive the motoring speed; and
depowering the one or more electric actuators after reaching the targeted new position.

15. The method of claim 11, wherein the motoring speed of the gas turbine engine is decreased to the idle speed or a below idle speed after reaching the targeted new position.

16. The method of claim 11, wherein the decrease of the motoring speed of the gas turbine engine is performed by a reduction in pressure delivered to a starter of the gas turbine engine.

17. The method of claim 11, wherein the motoring speed is reached based on controlling a starter to dry motor the gas turbine engine, wherein the starter is coupled to a high speed spool of the gas turbine engine, and the starter is controlled based on a speed of a low speed spool of the gas turbine engine and/or a taxi speed of the aircraft.

18. The method of claim 11, wherein the gas turbine engine is a first gas turbine engine and a starter provides a first motoring speed of the first gas turbine engine, and a second electric motor provides a second motoring speed of a second gas turbine engine of the aircraft during the taxi mode.

* * * * *